Sept. 29, 1942.　　W. S. GRAHAM ET AL　　2,297,299
MULTIPLE-ROW PLANTING ATTACHMENT FOR TRACTORS
Filed Dec. 31, 1938　　2 Sheets-Sheet 2

Inventors
William S. Graham
& Frederick E. Hand
By [signature]
Atty.

Patented Sept. 29, 1942

2,297,299

UNITED STATES PATENT OFFICE 2,297,299

MULTIPLE-ROW PLANTING ATTACHMENT FOR TRACTORS

William S. Graham and Frederick E. Hand, Canton, Ill., assignors to International Harvester Company, a corporation of New Jersey Application December 31, 1938, Serial No. 248,860

12 Claims. (Cl. 111—69)

This invention relates to planting attachments adapted to be directly connected to tractors and more particularly to planter attachments which can be quickly attached to or detached from the tractor.

The object of the invention is to provide a multiple-row planting attachment of the quick attachable type in which the planting tools may not only travel in rear of the rear axle structure and between the rear wheels of the tractor but also at points outside of the rear wheels of the tractor.

Another object of the invention is to provide a multiple-row planting attachment adapted to be connected to the rear of the tractor, which will have the planting tools advanced and forward toward the rear axle, so that the planting tools will not be so easily affected by the steering of the tractor; that is, so that the planter tools may be located as near as possible to the rear axle structure where they are least affected by steering and at the same time provide a planting attachment which is attachable to the rear of the tractor.

According to the present invention, there is provided a frame structure adapted to be attached to the rear axle structure of the tractor and which extends rearwardly to a point in rear of the rear wheels. This frame structure includes a transverse tool bar which extends to points outside of the tractor rear wheels. To this tool bar are attached brackets which extend forwardly and downwardly to points in advance of the tool bar, forwardly past the rim of the rear wheels, and near to the rear axle for the purpose of connecting the planter tools of the trailing type as near as possible to the rear of the tractor. These brackets may be located along the transverse bar so as to extend to points between and outside the rear wheels of the tractor. On the ends of these brackets are connected reversible members for the purpose of varying the point of connecting of the planting tools to the bracket, so that the planting attachment may be used for planting upon raised beds. Lifting means is provided on the frame structure for simultaneously pivoting the planting tools about the ends of the bracket when connected with a power lift means on the tractor, so that the entire arrangement may be entirely carried by the tractor for transport and turning at the ends. The entire attachment is directly connected to the rear axle structure and may be removed therefrom in its entirety. When the attachment is to be removed from the tractor, standards located on the forward portions of the frame structure and on the outer ends of the transverse tool bar may be lowered to support the attachment and permit the tractor to move away with the attachment left standing in position for recoupling.

For the objects and for a better understanding of the invention, reference may be had to the following detailed description taken in connection with the accompanying drawings, in which.

Figure 1:
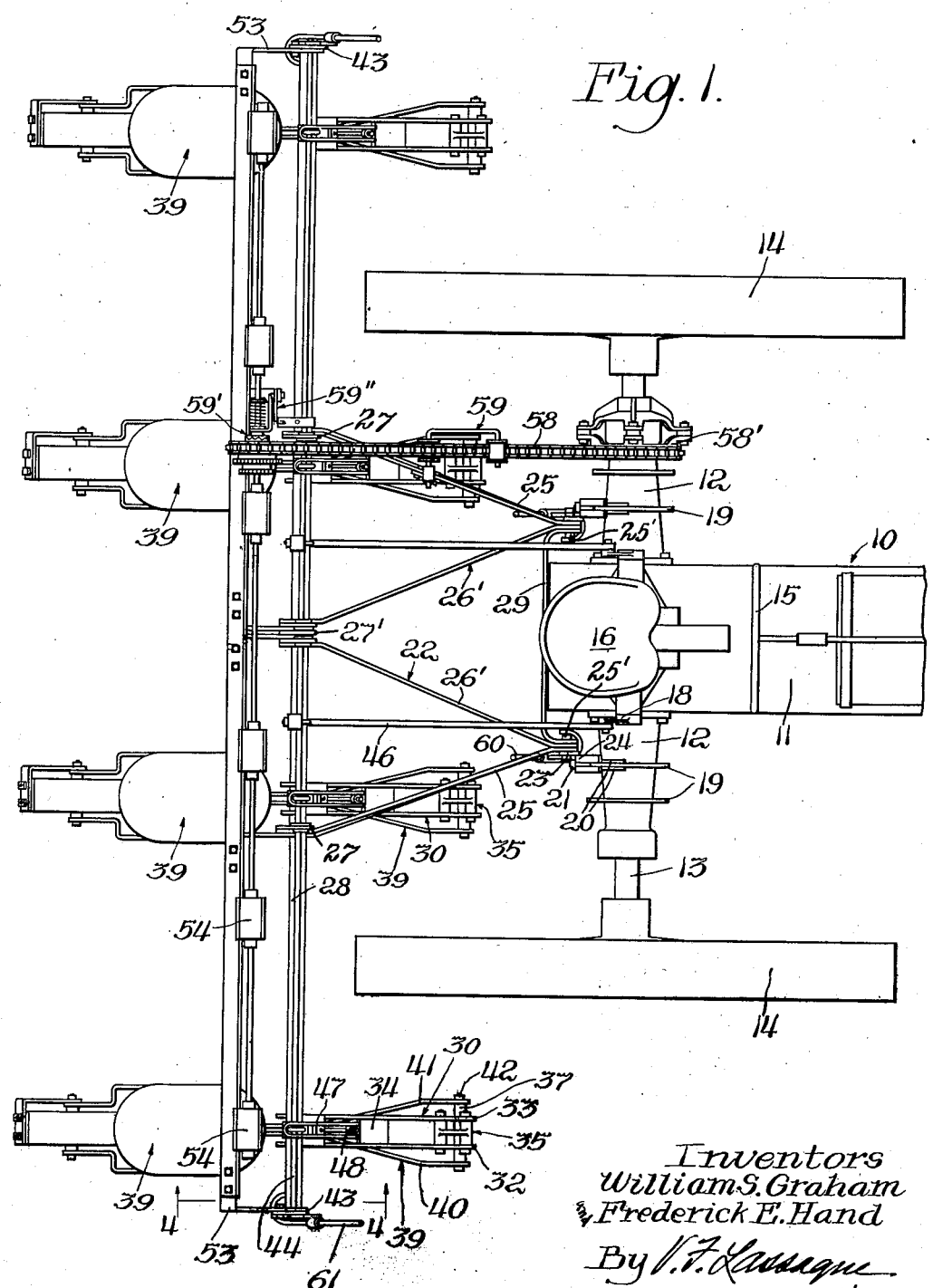
Figure 1 is a plan view of the rear portion of a tractor with the attachment connected thereto.

Referring now to the figures, there is shown a tractor designated generally at 10 having a transmission and differential mechanism 11 with rear axle housings 12 extending laterally therefrom and through which extend rear axles 13 for driving the rear wheels of the tractor 14 and having the usual tire rim. The transmission housing 11, the rear axle housings 12, and the rear axles 13 make up the rear axle structure of the tractor. The forward portion of the tractor, not shown, is that common to any tractor and particularly to a tractor of the tricycle type, and has a steerable mechanism adapted to be operated by a steering wheel 15 steered from an operator's station 16 on the rear part of the tractor. Mounted on the top of the transmission housing 11 is a power lift means of the type having a transversely extending shaft 17 extending to points on both sides thereof and having crank arms 18 at its outer ends. This power lift means is adapted to be driven hydraulically or may be driven mechanically by the motor of the tractor in the well known manner.

The rear axle housings 12 have the usual radially extending plates 19 for the attachment of two spaced plates 20 adapted to carry the usual swing bolts 21 therebetween. These plates and swing bolts provide a quick attachable means on the tractor.

The planter attachment comprises generally a frame structure designated generally at 22, which in turn comprises vertically extending members 23 having angled portions 24 with slots therein for the reception of the swing bolts. When these swing bolts are tightened against the angled portion 24, the frame structure is held rigidly on the tractor.

At the top of the members 23 there are connected side members 25 by means of bolts 25'. At the lower ends of the members 23 there are connected rearwardly and upwardly extending brace members 26. The side members 25 and the brace members 26 terminate at a point in the rear of the rear wheels. The rear ends of the side members 25 and the upwardly and rearwardly extending brace members 26 are secured to vertically extending plate members 27. The lower ends of these plate members 27 serve to carry a transversely extending tool bar 28, which is square in cross section and is so positioned in these plate members as to have its lower face thereof parallel to the ground. This transversely extending tool bar extends laterally to points outside of the rear wheels 14.

Between the upper ends of the members 23 there are also secured by bolts 25' a transverse brace 29 and a pair of inwardly and rearwardly extending brace members 26'. The rear ends of the brace members 26' are connected to a vertical extending structure 27' provided on the tool bar 28. Hence, it should now be seen that there has been provided a frame structure including a tool bar, which, when connected to the tractor, extends to a point rearwardly of the rear wheels thereof and by which the transverse tool bar may extend transversely outside of the rear wheels of the tractor.

Since the transverse bar extends to points outside of the rear wheels of the tractor, planter tools may be connected outside of the rear wheels. The means for so connecting the planter tools at their outsides is the same as that used for connecting them inside of the rear wheels, and takes the form of a bracket member 30 adapted to be so connected to the transverse tool bar by a U-bolt clamping means 31 as to extend forwardly and downwardly in advance of the transverse tool bar forwardly past the tire rims of the tractor wheels 14 to a point near to the rear axle structure and laterally adjacent to the tractor rear wheels. This bracket takes the form of two spaced members 32 and 33 retained in their spaced relation by means of a spacing plate 34 and having their forward ends open to receive a reversible member 35. This reversible member has portions of the same width as to fit between the spaced members 32 and 33 and is retained therebetween by bolts 36. This reversible member also has a portion 37, which is wider than this portion adapted to fit between the spaced members 32 and 33. To this portion may be pivotally connected substantially horizontally extending pull means 38 of planter tools 39 of the trailing type.

This pull means 38 of the planter tools 39 has two pull irons 40 and 41, Figure 1, which diverge from each other upon extending forwardly and connect to the wider portion 37 of the reversible member 35 by bolt means 42. The planter tool may thus have floating and vertical movement about the bolt means 42 and about the end of the bracket 30.

Figure 2:
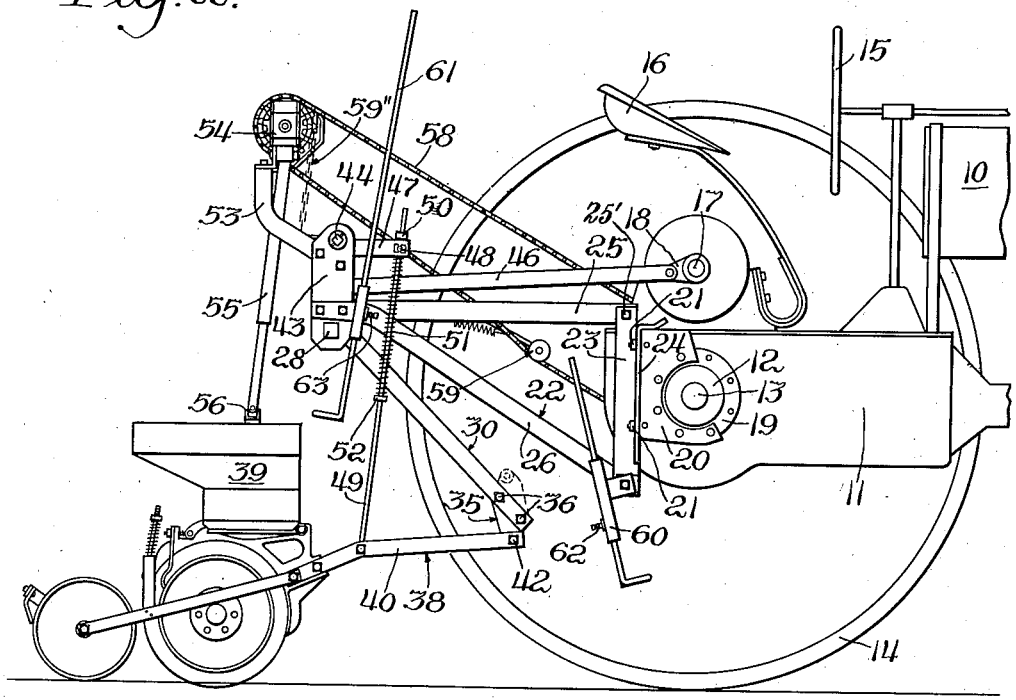
Figure 2 is an elevational view of the same portion of the tractor with one wheel removed, and of the attachment.
Figure 3:
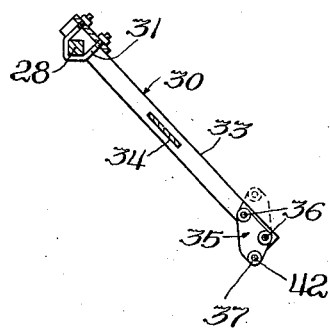
Figure 3 is a detail view of the forwardly and downwardly extending brackets attached to the tool bar and with the reversible member thereon; and, Figure 4 is an elevational view showing a portion of the rear end of the frame structure having the transverse bar connected thereto and taken on the line 4—4 of Figure 1.

When it is desired to use the planter tools for planting upon beds, the reversible member is reversed so that the wider portion 37 is above the end of the bracket, as indicated in dotted lines in Figures 2 and 3. In this position, the point of connection will be raised so that the wheels of the tractor may run in furrows while the planter tools may be above the same end on the beds being planted. By having the pull irons 40 and 41 diverge outwardly and having a wider portion on the reversible member, it is possible to make the connection to the reversible member in the reversed position. Hence, it should now be seen that there has been provided means whereby the point of connection of the planter tools to the frame structure may be adjusted.

Figure 4:
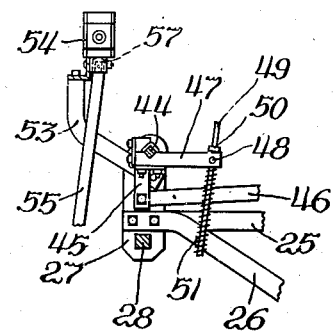

On the outer ends of the transverse tool bar 28 are also vertically extending plates 43 adapted to match with the plates 27 and to be in alinement therewith for the purpose of carrying a rock-shaft 44 that extends the entire length of the transverse tool bar. This rock-shaft has downwardly extending arms 45, Figure 4, adapted to be actuated by connecting links 46 connected respectively with crank arms 18 of the power lift means on the tractor. Adapted to be connected to the rock-shaft at any point thereon are forwardly extending lifting arms 47. These lifting arms may be adjusted along this rock-shaft to be in alinement with the planter tools. Their outer ends are provided with a trunnion means 48 for the reception of the upper ends of lifting rods 49 having a collar 50 at their upper ends adapted to engage with the trunnion and having their lower ends connected to the pull means 38 of the planter tools 39. On this lifting rod is a spring 51, which may abut against a collar 52 thereon for providing pressure on the planter tools and to help maintain them in the ground. When it is desired to raise all of the planter tools to a transport position, the power means on the tractor is actuated and the rock-shaft 44 is rocked to lift all of the planter tools in unison.

Carried by the plates 27 and 43 are rearwardly extending brackets 53 for the purpose of supporting a transversely extending drive mechanism 54 having power take-off shafts 55 at intervals along the length of the same to drive the individual planter tools 39. These power take-off shafts 55 are preferably of the telescoping type and are so connected through universal joints 56 and 57 as to provide certain lateral shifting of the same in order that they may be adapted to provide power to the planter tools, regardless of their different locations along the transverse tool bar. At 56 the joint is made with a shaft which extends upwardly through the seed hopper of the floatingly attached planting tool 39. By the telescoping and universal joints of this drive mechanism certain adjustability and flexibility is provided in the drive mechanism. This drive mechanism 54 may receive power through a chain 58 connected to a sprocket 58' on the rear axle 13 of the tractor and held tightly by a chain tightener means 59. The drive mechanism 54 has associated therewith the usual clutch mechanism 59' adapted to be thrown out upon raising of the planter tools by means of a linkage 59" connected to the rock-shaft 44. It should thus be seen that through the telescoping and universal joints of the planter drive mechanism just described means is provided which will drive the planter tools even though they float up and down over uneven ground.

On the forward end of the frame structure 22 are located adjustable standards 60 and on the outer ends of the transverse tool bar and fixed to the plates 43 are other standards 61. When it is desired to remove the attachment from the tractor, these standards are lowered to the ground and clamped in position respectively by clamping bolts 62 and 63 thereof. When so fixed to the ground, the chain 58 can be detached and also the connecting means 46 connected with the power lift means. Then, upon releasing the swing bolts 21, the tractor will be free from the attachment and may move out of the same, leaving the attachment in a position for the tractor to be readily backed into the same.

From the foregoing, it should now be seen that there has been provided an attachment adapted to be connected to the rear of the tractor which may be used for planting a plurality of rows wherein some of the rows are outside of the rear wheels of the tractor and in which all of the planter tools are connected to points forwardly and closely to the rear axle structure, forwardly past the tire rim of the tractor wheels, and whereby all the tools may be lifted in unison for the purpose of being transported by the tractor.

While various changes in the specific construction of the arrangement may suggest themselves, it shall be understood that such changes shall be within the spirit and scope of the invention as defined by the appended claims.

What is claimed is:

1. In combination, a tractor having a rear axle structure, a frame structure adapted to be rigidly attached to the tractor and to extend rearwardly of the rear axle structure, brackets adapted to be connected to the frame structure and to extend forwardly and downwardly to a point near to the rear axle structure, planting tools of the trailing type including a substantially horizontally extending pull means, and a reversible means adapted to be carried by the bracket for connecting the pull means thereto at different vertical locations.

2. In combination, a tractor having a rear axle structure, a frame structure adapted to be attached to the tractor and to extend rearwardly of the rear axle structure, a bracket adapted to be connected to the frame structure and to be inclined forwardly and downwardly in advance of its connection with the frame structure, said bracket including two spaced members, a reversible member adapted to be carried and removably fixed between the two spaced members in two positions, said reversible member having a portion wider than the width spaced by the two spaced members, this wider portion being located above the bracket in one of the positions of the reversible member, a planting tool of the trailing type including a pair of spaced pulling irons, the forward and connecting portions of which are sufficiently spaced to fit outside of the two spaced members of the bracket and to connect with the wider portion of the reversible member when in its position with the wider portion above the bracket.

3. In combination, a tractor having a rear axle structure, a frame structure adapted to be rigidly attached to the tractor and to extend rearwardly of the rear axle structure, said frame structure including a transversely extending tool bar, planting tools of the trailing type including a substantially horizontally extending pull means, and a seed hopper structure carried thereby, brackets adapted to be connected to the tool bar to be carried wholly thereby and to extend forwardly and downwardly to a point in advance of the tool bar, and said pull means pivotally connected for vertical movement to the forwardmost part of the forwardly and downwardly extending brackets.

4. In combination, a tractor having a rear axle structure, a frame structure adapted to be rigidly attached to the tractor and to extend rearwardly of the rear axle structure, said frame structure including a transversely extending tool bar, planting tools of the trailing type including a substantially horizontally extending pull means, brackets adapted to be connected to the tool bar and to extend forwardly and downwardly to a point in advance of the tool bar, and adjustable means associated with the brackets for connecting the pull means of the planter tools at different vertical locations thereon, each of said adjustable means including means for pivotally connecting the pull means therewith for vertical movement.

5. In combination, a tractor having a rear axle structure, a frame structure adapted to be rigidly attached to the tractor and to extend rearwardly of the rear axle structure, said frame structure including a transversely extending tool bar, planting tools of the trailing type including a substantially horizontally extending pull means, brackets adapted to be connected to the tool bar and to extend forwardly and downwardly to a point in advance of the tool bar, and a reversible means adapted to be carried by the brackets for connecting the pull means of the planter tools thereto at different vertical locations.

6. In combination, a tractor having a rear axle structure and rear wheels, a frame structure adapted to be rigidly attached to the rear axle structure and to extend rearwardly of the rear wheels, a transverse tool bar carried by the frame structure behind the rear wheels and extending transversely to points outside of the rear wheels, bracket members adapted to be connected to the tool bar at any point thereon between the rear wheels of the tractor and outside of either of the rear wheels, said bracket members extending forwardly to locations laterally adjacent to the rear wheels, planting tools pivotally connected to the brackets for vertical movement and adapted to be moved to transport position, and means for vertically moving said tools to their transport positions.

7. In combination, a tractor having a rear axle structure and rear wheels, power lifting means on the tractor, a frame structure adapted to be rigidly attached to the rear axle structure and to extend rearwardly of the rear wheels, a transverse tool bar carried by the frame structure at a location in rear of the rear wheels and extending transversely to points outside of the rear wheels, bracket members adapted to be connected to the tool bar at any point thereon between the rear wheels of the tractor and outside of the rear wheels and extending forwardly to locations laterally adjacent to the rear wheels, planting tools respectively pivotally connected to the brackets for vertical movement, and means on the frame structure and adapted to be connected with the power means on the tractor for vertically moving said tools.

8. In combination, a tractor having a rear axle structure, rear wheels and power means, a frame structure rigidly connected to the tractor and adapted to extend in rear of the rear axle structure to a point rearwardly of the rear wheels, said structure including a transverse tool bar extending in rear of the rear wheels to points outside thereof, forwardly and downwardly extending brackets adapted to be connected to the tool bar in a plurality of locations therealong inside and outside of the rear wheels and each of which is adapted to extend forwardly to locations laterally adjacent the rear wheels, a planting tool pivotally connected to each bracket for vertical movement at a location in advance of the tool bar, a transversely extending rock-shaft carried on the frame structure and having lifting arms extending forwardly, means connecting the rock-shaft to the power means for rocking said shaft by said power means, and said lifting arms in turn connected to the planter tools whereby the same will be lifted about the brackets.

9. In combination, a tractor having rear wheels, a frame structure adapted to be rigidly attached to the tractor and to extend rearwardly to a point in rear of the rear wheels, brackets adapted to be connected to the frame structure and to extend downwardly and forwardly to locations laterally adjacent to the rear wheels, planting tools of the trailing type connected to the brackets at a point laterally adjacent to the rear wheels, a driving mechanism on the frame structure adapted to be driven from the tractor, and an adjustable and flexible driving connection connected with the planter tool for driving the planter tool as it floats up and down.

10. In combination, a tractor having a rear axle structure, a frame structure adapted to be rigidly attached to the tractor and to extend rearwardly of the rear axle structure, a tool bar carried at the rear of the frame structure, a driving mechanism adapted to be driven by the tractor, said driving mechanism connected to the rear of the frame structure and extending transversely across the same, forwardly and downwardly extending draft means connected to the tool bar, trailing type planting tools connected to the draft means for vertical movement with respect to said frame structure and each of which having a seed can arranged to be located immediately below the driving mechanism, and a flexible driving connection between said driving mechanism and the seed can of each of said planting tools.

11. In combination, a tractor having a rear axle structure, a frame structure rigidly attached to the tractor to extend rearwardly of the rear axle structure, a tool bar carried at the rear of the frame structure, above said axle structure, a rock shaft on the frame structure, a driving mechanism adapted to be driven by the tractor, said driving mechanism connected to the rear of the frame structure and extending transversely across the same, downwardly extending draft means secured to said tool bar, trailing type planting tools connected to the draft means for vertical movement between the ground and said tool bar, each of said planting tools having parts adapted to be driven located substantially underneath the driving mechanism, flexible drive connections between said driving mechanism and the driven parts of said planting tools, and link means connected to said rock shaft and said planting tools for raising and lowering said tools.

12. In combination, a tractor having a rear axle structure, a frame structure rigidly attached to the tractor to extend rearwardly of the rear axle structure, a tool bar carried at the rear of the frame structure, above said axle structure, a rock shaft on the frame structure, a driving mechanism adapted to be driven by the tractor carried by the frame structure, downwardly extending draft means secured to said tool bar, trailing type tools having a seed hopper structure connected to the downwardly extending draft means for vertical movement, and link means connected to the trailing type tools and the rock shaft for raising and lowering said tools and their seed hopper structures.

WILLIAM S. GRAHAM.
FREDERICK E. HAND.